United States Patent
Bronicki et al.

(10) Patent No.: US 7,950,214 B2
(45) Date of Patent: May 31, 2011

(54) METHOD OF AND APPARATUS FOR PRESSURIZING GAS FLOWING IN A PIPELINE

(75) Inventors: Lucien Y. Bronicki, Yavne (IL); Joseph Sinai, Or-Yehuda (IL)

(73) Assignee: Ormat Technologies Inc., Sparks, NV (US)

( * ) Notice: Subject to any disclaimer, the term of this patent is extended or adjusted under 35 U.S.C. 154(b) by 1114 days.

(21) Appl. No.: 10/571,539

(22) PCT Filed: Sep. 9, 2004

(86) PCT No.: PCT/IL2004/000823
§ 371 (c)(1),
(2), (4) Date: Jan. 16, 2007

(87) PCT Pub. No.: WO2005/024188
PCT Pub. Date: Mar. 17, 2005

(65) Prior Publication Data
US 2007/0199606 A1   Aug. 30, 2007

(30) Foreign Application Priority Data

Sep. 11, 2003   (IL) .......................... 157887

(51) Int. Cl.
 F02C 6/00   (2006.01)
 F02G 1/00   (2006.01)
 F02G 3/00   (2006.01)
(52) U.S. Cl. ..................... 60/39.181; 417/251
(58) Field of Classification Search ........... 60/39.15, 60/39.181, 39.182; 417/251, 252
See application file for complete search history.

(56) References Cited

U.S. PATENT DOCUMENTS

| | | | | |
|---|---|---|---|---|
| 4,321,790 A | * | 3/1982 | Vadas et al. | 60/783 |
| 4,569,195 A | * | 2/1986 | Johnson | 60/39.3 |
| 4,640,308 A | * | 2/1987 | Toelle | 137/596.18 |
| 5,632,143 A | | 5/1997 | Fisher et al. | |
| 2003/0161731 A1 | * | 8/2003 | Blotenberg | 417/2 |

FOREIGN PATENT DOCUMENTS

| | | |
|---|---|---|
| DE | 42 34 393 | 9/1993 |
| EP | 0 162 368 | 11/1985 |
| EP | 1174590 | * 1/2002 |
| EP | 1 389 672 | 2/2004 |
| FR | 2 440 482 | 5/1980 |
| GB | 2 063 370 | 6/1981 |
| WO | 2004/074641 | 9/2004 |

* cited by examiner

*Primary Examiner* — Michael Cuff
*Assistant Examiner* — Andrew Nguyen
(74) *Attorney, Agent, or Firm* — Oblon, Spivak, McClelland, Maier & Neustadt, L.L.P.

(57) ABSTRACT

The present invention is directed to auxiliary apparatus for augmenting the pressure head of a gas flowing in a pipeline that may be provided by at least one gas turbine running a first pressure augmenting means, said auxiliary apparatus comprising: a vapor turbine operatively connected to a second pressure augmenting means; first connection means for providing fluid communication between said pipeline and said second pressure augmenting means; second connection means for providing fluid communication between said first pressure augmenting means and said second pressure augmenting means; and heating means for vaporizing a working fluid of said vapor turbine. In one embodiment, a bypass means for said pipeline having a bypass conduit and shut-off valve system are provided for connecting said first pressure augmenting means to the downstream portion of said pipeline via a bypass conduit. In a further embodiment, the vaporizer of the working fluid utilizes the heat of an intermediate fluid. Furthermore, in accordance with the present invention, a method is provided for augmenting the pressure head of a gas flowing in a pipeline for transporting natural gas in a natural gas pipeline transmission system.

30 Claims, 6 Drawing Sheets

METHOD OF AND APPARATUS FOR PRESSURIZING GAS FLOWING IN A PIPELINE

TECHNICAL FIELD

The present invention relates to an apparatus and method for pressuring fluid, particularly gas that is flowing in a pipeline. The present invention is particularly applicable to an apparatus and method for compressing gas flowing in a pipeline in a pipeline booster compressor installation.

BACKGROUND

In recent times, the use of natural gas has become more popular and consequently more gas pipelines are being used around the world. In addition, the efficiency of systems providing power for compressors compressing gas flowing in such gas pipelines has become more and more important. Often gas turbines are used to provide power for compressors used in such installations. However, such arrangements can be inefficient, and, the relatively high temperature exhaust gas of the gas turbines is exhausted to the ambient surrounding air without utilizing the heat contained therein.

It is an object of the present invention to provide a new and improved method of and apparatus for compressing gas flowing in a pipeline wherein the disadvantages as outlined are reduced or substantially overcome.

It is another aim of the present invention to provide such an apparatus and method that provides significant improvements in pressure augmentation efficiency and performance of a pipeline.

It is another aim of the present invention to provide such apparatus that is retrofitable within existing booster stations, and a retrofit method, particularly with minimal or nominal modification thereof or of the surrounding area.

It is another aim of the present invention to provide such an apparatus and method that may permit an existing booster station and the pipeline to deliver higher flow rates.

It is another aim of the present invention to provide such an apparatus and method that is simple to install and to operate.

It is another aim of the present invention to provide such an apparatus that is relatively simple mechanically and thus economic to produce as well as to maintain.

SUMMARY OF INVENTION

The present invention is directed to auxiliary apparatus for augmenting the pressure head of a gas flowing in a pipeline that may be provided by at least one gas turbine running a first pressure augmenting means, said auxiliary apparatus comprising: — a vapor turbine operatively connected to a second pressure augmenting means;
first connection means for providing fluid communication between said pipeline and said second pressure augmenting means;
second connection means for providing fluid communication between said first pressure augmenting means and said second pressure augmenting means; and
heating means for vaporizing a working fluid of said vapor turbine.

In addition, the present invention is also directed to auxiliary apparatus for augmenting the pressure head of a gas flowing in a pipeline that may be provided by at least one gas turbine running a first pressure augmenting means, said auxiliary apparatus comprising:

a vapor turbine operatively connected to a second pressure augmenting means;
first connection means for providing fluid communication between said pipeline and said second pressure augmenting means;
second connection means for providing fluid communication between said first pressure augmenting means and said second pressure augmenting means;
heating means for vaporizing a working fluid of said vapor turbine; and
bypass means for said pipeline having a bypass conduit and shut-off valve system for connecting said first pressure augmenting means to the downstream portion of said pipeline via a bypass conduit.

Advantageously, the working fluid flows in a closed circuit which comprises a heat exchanger operatively connected to said heating means, typically in the form of a heat recovery boiler arrangement, for recovering waste heat produced by said at least one gas turbine, and further comprises a suitable condenser for producing condensate of said working fluid and a pump arrangement for providing said working fluid to said heating means.

Moreover, the present invention relates to auxiliary apparatus for augmenting the pressure head of a gas flowing in a pipeline that may be provided by at least one gas turbine running a first pressure augmenting means, said auxiliary apparatus comprising:

(a) a vapor turbine operatively connected to a second pressure augmenting means;
(b) first connection means for providing fluid communication between said pipeline and said second pressure augmenting means;
(c) second connection means for providing fluid communication between said first pressure augmenting means and said second pressure augmenting means;
(d) heating means for vaporizing a working fluid of said vapor turbine;
(e) an intermediate fluid;
(f) a heater that heats the intermediate fluid with heat from said heating means and produces a heated intermediate fluid;
(g) a working fluid vaporizer that vaporizes said liquid working fluid with heat from the heated intermediate fluid to form a vaporized working fluid and a cooled intermediate fluid; and
(h) a fluid condenser that condenses said expanded organic vaporized working fluid to produce a working fluid condensate so that the working fluid condensate is supplied to the working fluid vaporizer.

The present invention also relates to augmenting apparatus, and corresponding method, for providing pressure to a gas flowing in a pipeline, comprising: — at least one suitable gas turbine adapted for running a first pressure augmenting means in fluid communication with a said pipeline for providing a first pressure head in said pipeline; and
at least one auxiliary apparatus according to the invention, in fluid communication with said pipeline and said gas turbine, for providing a second pressure head in said pipeline.

The present invention is further directed to a pipeline and corresponding method for transporting a gas from at least one source to at least one destination, comprising the provision and use of at least one such augmentation apparatus for providing fluid pressure to the gas flowing in said pipeline.

Further, the present invention is directed to a method for augmenting the pressure head of a gas flowing in a pipeline that may be provided by at least one gas turbine having a first pressure augmenting means, comprising: —
(a) providing a vapor turbine operatively connected to a second pressure augmenting means;
(b) providing fluid communication between said pipeline and said second pressure augmenting means;
(c) providing fluid communication between said first pressure augmenting means run by a said gas turbine and said second pressure augmenting means; and
(d) vaporizing a working fluid of said vapor turbine and expanding the vaporized working fluid in said vapor turbine to provide power to run said second pressure augmenting means, such as to provide a second pressure head to gas flowing through said second pressure augmenting means in addition to the first pressure head provided by said first pressure augmenting means.

In addition, the present invention is also directed to a method for augmenting the pressure head of natural gas flowing in a natural gas pipeline that may be provided by at least one gas turbine running a first pressure augmenting means, comprising:
(a) providing a vapor turbine operatively connected to a second pressure augmenting means;
(b) providing fluid communication between said natural gas pipeline, which is portion of natural gas pipeline transmission system, and said second pressure augmenting means;
(c) providing fluid communication between said first pressure augmenting means run by said gas turbine and said second pressure augmenting means for transferring natural gas flowing in said natural gas pipeline from said first pressure augmenting means and said second pressure augmenting means; and
(d) vaporizing a working fluid of said vapor turbine and expanding the vaporized working fluid in said vapor turbine to provide power to run said second pressure augmenting means and provide a second pressure head to natural gas flowing through said second pressure augmenting means in addition to the first pressure head provided to said natural gas by said first pressure augmenting means.

Advantageously, in both steps (d) mentioned above, the heat present in the exhaust gases of said gas turbine is used for vaporizing said working fluid, and optionally further includes the step of condensing expanded vapors exiting said vapor turbine to form condensate, typically by means of a suitable air-cooled condenser. The condensate may then be returned to a suitable heat recovery boiler for vaporizing the working fluid according to the steps (d). Optionally, in steps (d) a heated intermediate fluid, heated by means of the heat present in the exhaust gases of said gas turbine, is typically used for vaporizing said working fluid to form a vaporized working fluid, and the working fluid may be condensed after expansion through said vapor turbine to produce a working fluid condensate so that the working fluid condensate may be returned for vaporizing by means of said heated intermediate fluid. Further optionally, a vaporized intermediate fluid, vaporized by means of the heat present in the exhaust gases of said gas turbine, is used for vaporizing said working fluid to form a vaporized working fluid, and working fluid may be condensed after expansion through said vapor turbine to produce a working fluid condensate so that the working fluid condensate may be returned for vaporizing by means of said vaporized intermediate fluid. A secondary vapor turbine may be provided that expands said vaporized intermediate working fluid for generating power and producing expanded vaporized intermediate working fluid, and the secondary vapor turbine may be operatively coupled to said second pressure augmenting means for further augmenting the pressure head provided by said gas turbine.

Preferably, the method further includes the step of cooling the said gas between the stages of compression provided by the said first pressure augmenting means and said second pressure augmenting means, and a suitable heat transfer fluid may be heated with heat removed from said gas between the stages of compression provided by the said first pressure augmenting means and said second pressure augmenting means. The heat transfer fluid may be further heated with waste heat provided by said gas turbine and optionally heat present in said heated transfer fluid may be transferred to a heat consumer.

The method optionally further comprises the step of providing a suitable bypass system such as to enable the selective channeling of gas from the pipeline into one or the other of: —
a first channel in which gas is pressurized by said first pressure augmenting means and said second pressure augmenting means; and
a second channel in which said second pressure augmenting means are bypassed by gas flowing through said pipeline.

BRIEF DESCRIPTION OF FIGURES

Like reference numerals and designations on the various drawings refer to like elements.

DISCLOSURE OF INVENTION

The present invention is defined by the claims, the contents of which are to be read as included within the disclosure of the specification, and will now be described by way of example with reference to the accompanying Figures.

The term fluid used herein refers to gases, vapors, liquids and mixtures thereof, unless otherwise specified.

The relative positional terms "upstream" and "downstream" herein refer to directions generally away from and along the direction of flow, respectively, of a fluid including gases, liquids and mixtures thereof, unless otherwise specified.

"Gas turbine" herein refers to a combination of an air compressor, a combustor for combusting fuel, and a turbine. The hot gases exiting the combustor expand in the turbine, and the turbine drives both the air compressor and an external load, for example a gas compressor or an alternator. This is differentiated from "vapor turbine" which herein refers to a turbine driven by the expansion of hot pressurized vapors.

The present invention relates to a pressure augmenting apparatus and method used, typically in a booster station, for providing gas pressure to a gas flowing in a pipeline, and in particular to an apparatus and corresponding method that uses a vapor turbine, in addition to a gas turbine, in providing gas pressure to a gas flowing in a pipeline.

Auxiliary apparatus is described herein and is taken to correspond also to ancillary apparatus or supplementary apparatus.

The pressure augmenting apparatus comprises: —
- at least one suitable gas turbine adapted for running a first pressure augmenting means, such as a first compressor, in fluid communication with a said pipeline for providing a first pressure head in said pipeline; and
- at least one auxiliary apparatus in fluid communication with said pipeline and said gas turbine, for providing a second pressure head in said pipeline.

According to the present invention, the auxiliary apparatus comprises:
- a vapor turbine operatively connected to a second pressure augmenting means, such as a second compressor;
- first connection means for providing fluid communication between said pipeline and said second pressure augmenting means;
- second connection means for providing fluid communication between said first pressure augmenting means and said second pressure augmenting means;
- heating means for vaporizing a working fluid of said vapor turbine.

The present invention is particularly characterized in providing at least one second compressor arranged in series with respect to the first compressor (run by a gas turbine), for further augmenting the pressure of the gas flowing in pipeline, and driven directly or indirectly by at least one vapor turbine.

Figure 1:
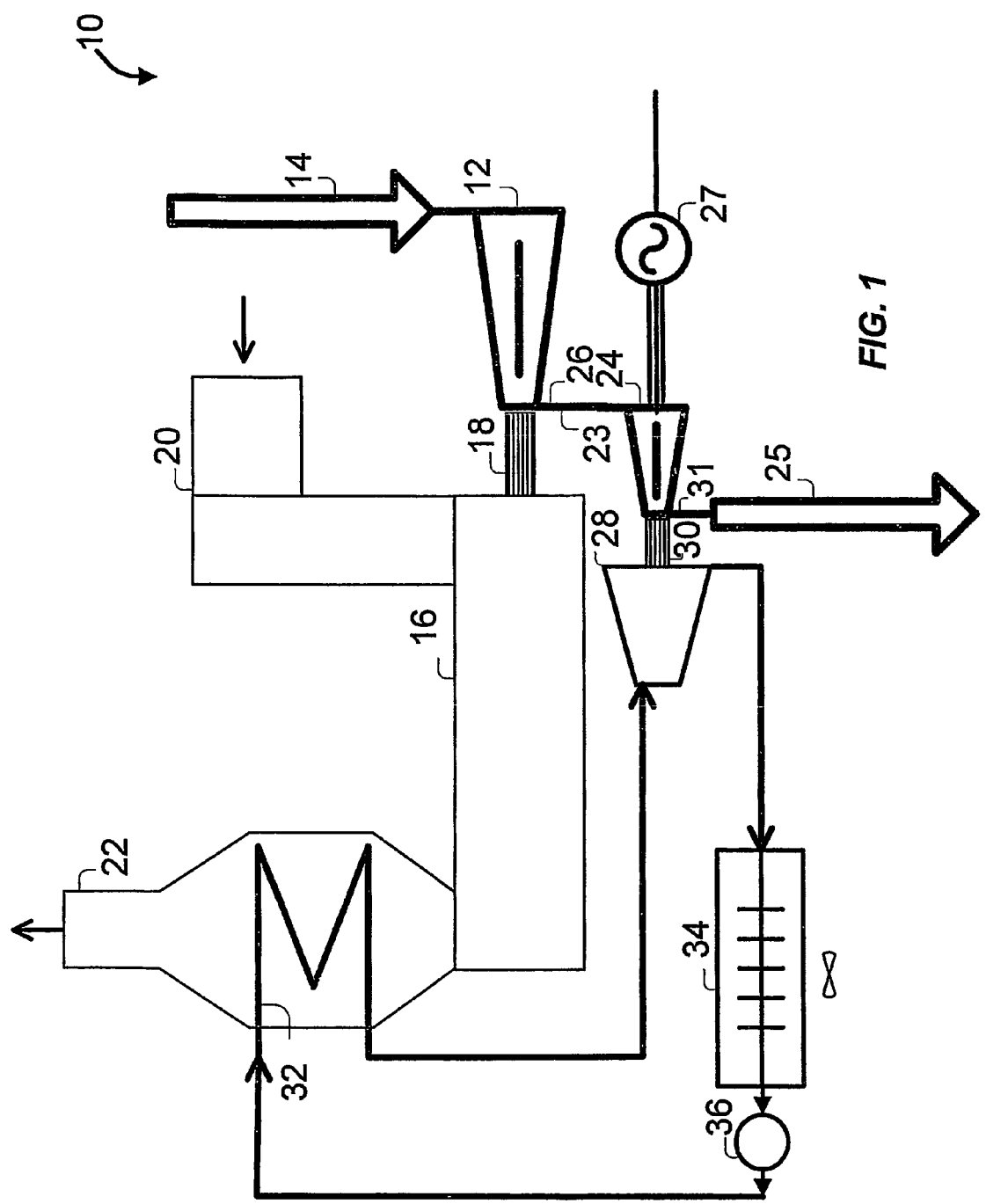
FIG. 1 illustrates the general layout of the main elements of the first embodiment of the present invention.

Referring now to the drawings, reference numeral 10 of FIG. 1 designates pressure augmenting apparatus for compressing gas flowing in a pipeline that is designed and operated in accordance with the present invention, according to a first embodiment of the present invention.

Apparatus 10 also includes at least one first compressor 12 for compressing the gas flowing in gas pipeline 14. First compressor 12 is driven or operated by gas turbine 16 via coupling 18—either directly or indirectly, via a gearing arrangement, for example. Gas turbine 16 uses air supplied through duct 20 and produces mechanical power for running compressor 12. Gas turbine 16 includes an air compressor (not shown) for compressing the air supplied via inlet duct 20, a combustor (not shown) for combusting fuel supplied thereto in the presence of air supplied by the air compressor and turbine (not shown) for expanding the hot combustion products or gases exiting the combustor. Exhaust gas produced by gas turbine 16 exits via stack 22.

Figure 2:
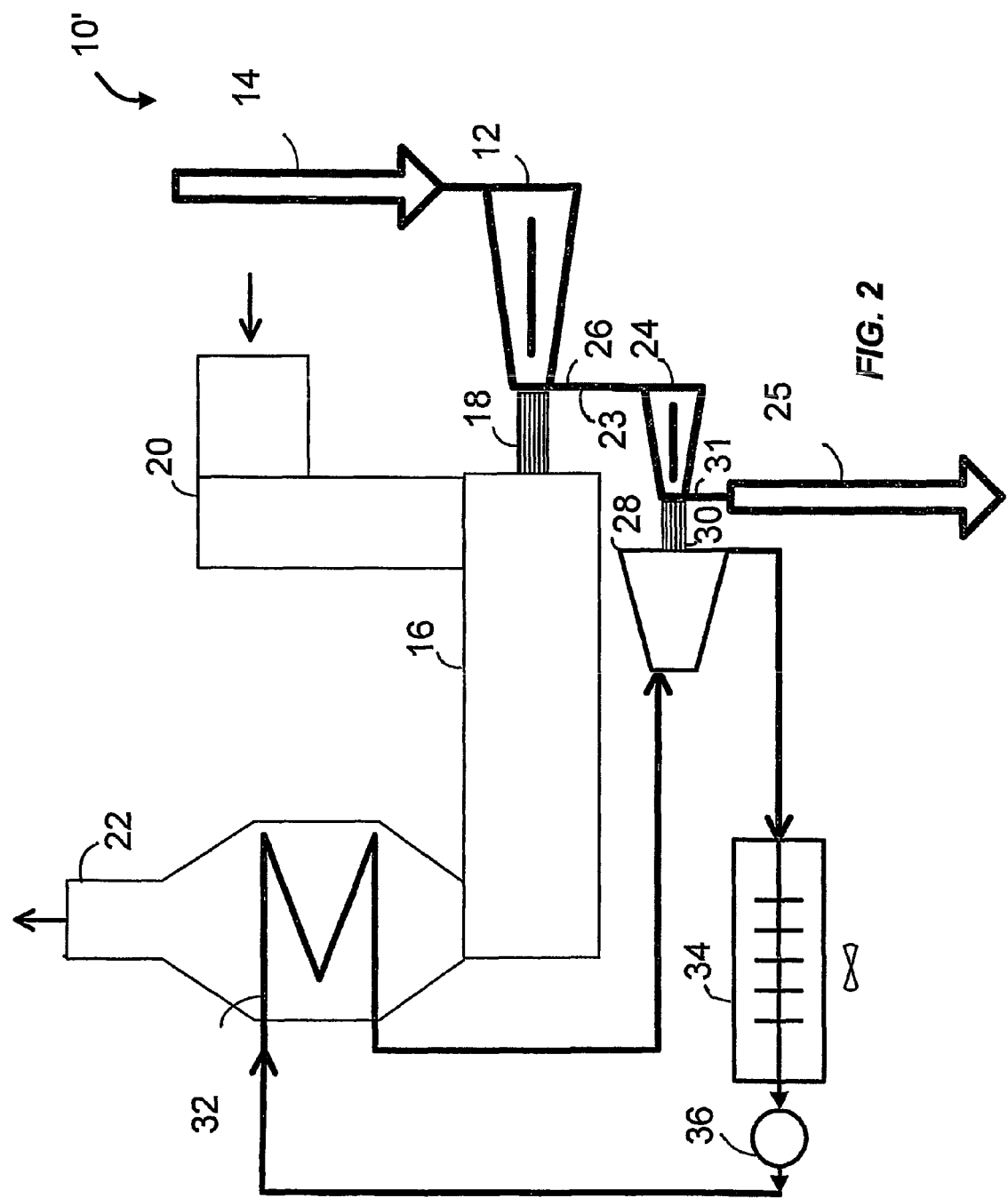
FIG. 2 illustrates a further option of the general layout of the main elements of the first embodiment of the present invention.

Apparatus 10 is particularly characterized in also including second compressor 24, arranged in series with, and in close proximity to, the first compressor 12, for further compressing the compressed gas exiting first compressor 12 via line 26. Second compressor 24 is also driven or operated here by vapor turbine 28 via coupling 30, directly or indirectly. Preferably, vapor turbine 28 receives vapor from heat recovery boiler 32 that is produced from liquid working fluid present therein which receives heat from the exhaust gas exiting gas turbine 16. Condenser 34, which can be air-cooled or water-cooled, preferably air-cooled, receives expanded vapor that exits vapor turbine 28 and produces condensate that is supplied by pump 36 from condenser 34 to heat recovery boiler 32 thus completing the power cycle. While the vapor turbine may be a steam turbine, preferably, the vapor turbine is an organic vapor turbine using an organic working fluid (directly or indirectly using an intermediate heat transfer fluid cycle, using for example thermal oil). Examples of such an organic working fluid may be pentane, either n-pentane or iso-pentane, or any other suitable organic working fluid, used in the vapor turbine in the power cycle operating in accordance with an organic Rankine cycle. In addition, this embodiment of the present invention optionally includes electric generator or alternator 27 that is also driven or operated by vapor turbine 28. However, if preferred or if more convenient, electric generator or alternator 27 need not be included in this embodiment of apparatus (10') of the invention, as illustrated in FIG. 2 which shows a general layout of the main elements of this option of the first embodiment of the present invention.

In the present embodiment, first compressor 12 is preferably of a larger rating than that of second compressor 24. As a non-limiting example, also here, compressor 12 compresses the gas flowing in gas pipeline 14 to more than 50%, and preferably to about 80% of the required pressure head while second compressor 24 compresses the compressed gas exiting first compressor 12 by less than 50% of the required pressure head, preferably a further approximately 20% of the remaining pressure head. Thus, the first pressure head provided by the first compressor 12 is typically substantially greater than the second pressure head provided by the second compressor 24. Preferably the first pressure head is about 4 times greater than the second pressure head.

In operation, first compressor 12, driven or operated by gas turbine 16, compresses the gas flowing in gas pipeline 14 and produces compressed gas. Second compressor 24 further compresses the compressed gas exiting first compressor 12 and produces, in the downstream portion of gas pipeline 25, further compressed gas. Vapor turbine 28 drives or operates second compressor 24 via coupling 30 as well as electric generator or alternator 27 and receives vapor produced by heat recovery boiler 32 which utilizes heat contained in the exhaust gas exiting gas turbine 16. These vapors expand in vapor turbine 28 and produce work so that the vapor turbine drives second compressor 24 via coupling 30 causing it to rotate and consequently compress the compressed gas present in line 26 to produce further compressed gas in gas pipeline 25. In addition, electric generator or alternator 27 is rotated via coupling 38 and generates electricity. Expanded vapor exiting vapor turbine 28 is supplied to condenser 34, which is preferably air-cooled where it condenses and the condensate produced is supplied by cycle pump 36 to heat recovery boiler 32 thus completing the power cycle. Thus, by making use of the heat present in exhaust exiting gas turbine 16 through heat recovery boiler 32, a more efficient system is used. When increased flow is required in the pipeline (and increased pressure), most of the load on the vapor turbine will be come from second compressor 24, with the electric generator or alternator supplying reduced electric power or electricity. On the other hand, at low rates in the pipeline, the electric power or electricity supplied by with the electric generator or alternator will be increased.

According to the present invention, auxiliary apparatus in the form of a retrofit kit can be provided for augmenting a gas turbine in the generation of gas pressure in a pipeline. Referring again to FIG. 1, in a first embodiment the auxiliary apparatus comprises a vapor turbine 28 operatively connected to a second compressor 24; first connection means 31 for providing fluid communication between the second compressor 24 and the pipeline 14; and second connection means 23 for providing fluid communication between the second compressor 24 and the first compressor 12 run by the gas turbine. The auxiliary apparatus also comprises suitable heating means (typically adapted for extracting waste heat from a suitable gas turbine exhaust, such as for example heat recovery boiler 32) for vaporizing the working fluid of the vapor turbine 28, and suitable condenser 34 and pump 36 for completing the vapor turbine cycle. Optionally, the vapor turbine 28 of the auxiliary apparatus may be directly or indirectly coupled to the second compressor 24 in a similar manner to that described herein in the context of the augmenting apparatus of the present invention, mutatis mutandis.

As with the augmenting apparatus described herein, the auxiliary apparatus may also further comprise intercooler means in communication with said second connection means for cooling gas flowing between said first compressor and said second compressor. The intercooler means optionally further includes a suitable heat transfer fluid flowing in a closed circuit which comprises a heat exchanger operatively connected to said heat recovery boiler arrangement, for producing further heated heat transfer fluid, and a pump arrangement for providing said transfer fluid to said heat recovery boiler arrangement. Optionally, means are provided for transferring heat present in said further heated heat transfer fluid to a heat consumer. Further optionally, the auxiliary apparatus further comprises electricity generating means coupled to said vapor turbine, and/or a suitable electric motor means suitably coupled to said second compressor, the motor means optionally receiving electrical power from said generating means.

The pressure augmenting apparatus (10) of the present invention, according to first and indeed all embodiments thereof, may be advantageously provided as a unit to any number of locations along a pipeline, according to the decay of the pressure head in the pipeline as fluid flows therethrough. Thus, the present invention can be used in a new pipeline compressor installation and bring about an increased energy efficiency level. For example, the size and energy consumption of the gas turbine, and thus both the capital and running costs thereof, may be reduced in correspondence to the additional compression that can be provided by the vapor turbine, at no substantial additional energy costs.

Nevertheless, it should be pointed out that the present invention can also be used in an existing pipeline compressor installation wherein the second compressor may be added to the existing pipeline compressor installation (without exceeding the existing upper pressure limit of the existing pipeline compressor installation). The arrangement provided by the present invention has advantages which include enabling the booster station to be run at optimal efficiency, and when higher than nominal gas flows are required in the pipeline, the vapor turbine can be brought on-line to provide the additional required pressure head. On the other hand, when the pressure head provided by the vapor turbine is not required, the mechanical power generated by the vapor turbine may be converted to electricity and stored or exported.

In either case, it is also possible in the present invention to run both the gas turbine and the vapor turbine at their optimal running speeds, optimizing the performance of both. It should be pointed out that by operating the second compressor, in accordance with the present invention, by having it driven by a vapor turbine operating on vapor produced by the heat recovery boiler, further compression of the gas flowing in the pipeline can be achieved without the need of increasing the fuel consumption of the gas turbine. This is irrespective of whether the vapor turbine also generates electricity or not.

In this manner, it is also possible to provide optimal and steady state conditions at least for the gas turbine, thereby minimizing maintenance costs while maximizing operating life of the gas turbine, since for example at peak loads the vapor turbine provides the additional pressure head rather than by way of increasing the speed of the gas turbine.

The first compressor 12 is in communication with the second compressor 24 via conduit 26, and the effectiveness of having the first compressor 12 and the second compressor 24 in series to efficiently provide a pressure head in the pipeline 14 is increased when the two compressors are closer together. In other words, when these two compressors are close together, the combined pressure head is such as to maintain a useful pressure in the pipeline for a longer distance between booster stations than if the two compressors are significantly distanced apart. The closeness of the two compressors provides advantages such as for example that the vapor turbine 28 may be sufficiently close to the exhaust 22 of the gas turbine to enable the waste heat to be efficiently utilized, and both the vapor turbine and the gas turbine may be housed in the same common structure, typically a booster station. Furthermore, the surge margin of the combination is greater than that of the first compressor, and the first compressor operates at full flow and at lower pressure compared to a single compressor (that can provide the combined pressure head) which would operate at a higher speed. It is also possible to run one or both of the first and second compressors at their individual optimal speeds, and the gas turbine and the vapor turbine may be controlled such as to provide the minimum fuel consumption for the gas turbine while maximizing the pressure head. Similar considerations may apply to other embodiments of the invention, mutatis mutandis. The serial arrangement of the present invention is therefore not similar to the disposition of two consecutive compressors in a gas line, each driven by a gas turbine which are typically distanced several hundred kilometers one from the other along the pipeline.

Figure 3:
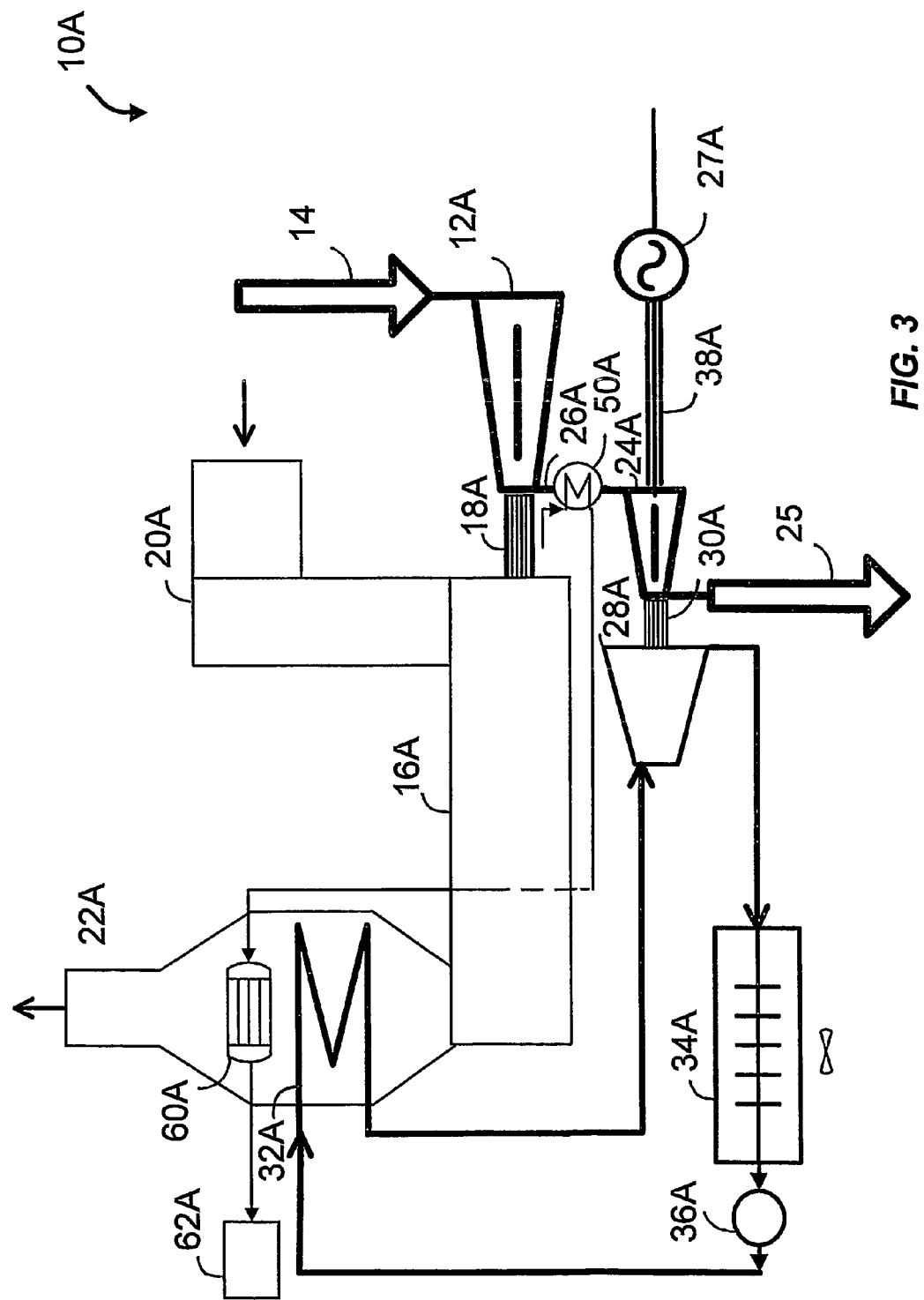
FIG. 3 illustrates the general layout of the main elements of the second embodiment of the present invention.

Referring to FIG. 3, a second embodiment of the present invention is now described, where reference numeral 10A designates the augmenting apparatus designed and operated in accordance with a further embodiment of the present invention. The second embodiment differs from that described with reference to FIG. 1 and FIG. 2 in that an intercooler is provided for cooling compressed gas exiting the first compressor and prior to entering the second compressor. In this embodiment, intercooler 50A is included for cooling compressed gas exiting first compressor 12A and prior to entering second compressor 24A. Heat extracted from the exhaust gas of gas turbine 16A by heat exchanger 60A can also be added to the heat extracted by intercooler 50A and supplied to heat consumers to make use of this heat. For example, this can be used for process heat or industrial process heat, and/or commercial process heat and/or domestic heating purposes. Alternatively, this heat can be accumulated and stored for later use.

Thus, intercooler 50A cools compressed gas exiting first compressor 12A and flowing in line 26A by transferring heat to a heat transfer medium present in intercooler 50A so that cooled compressed gas is supplied to second compressor 24A and heated heat transfer medium is produced by intercooler 50A. In addition, heat still present in exhaust gas of gas turbine 16A is transferred to heat transfer medium present in heat exchanger 60A supplied from intercooler 50A. The further heated heat transfer medium exiting heat exchanger 60A is supplied to a heat consumer or heat consumers for use in e.g. an industrial process heat process. In this embodiment since the compressed gas exiting first compressor 12A is cooled prior to supplying it to second compressor 24A, the efficiency of compression of the gas flowing in the gas pipeline is increased. Apart from this, this embodiment is comprised of items substantially identical with those making up the embodiment described with reference to FIG. 1 and FIG. 2. In general, the operation of the present embodiment is similar to the operation of the embodiment described with reference to FIG. 1 and FIG. 2 but, here, in addition, intercooler 50A operates to cool compressed gas exiting first compressor 12A and flowing in line 26A by transferring heat to a heat transfer medium, such as water for example, present in intercooler 50A so that cooled compressed gas is supplied to second compressor 24A and heated heat transfer medium is produced by intercooler 50A, In addition, heat still present in exhaust gas of gas turbine 16A is transferred to heat transfer medium present in heat exchanger 60A supplied from intercooler 50A. The further heated heat transfer medium exiting heat exchanger 60A is supplied to heat consumer or heat consumers 62A for use in e.g. an industrial process heat process. In this embodiment, since the compressed gas exiting first compressor 12A is cooled prior to supplying it to second compressor 24A, the efficiency of compression of the gas flowing in the gas pipeline is increased.

Figure 4:
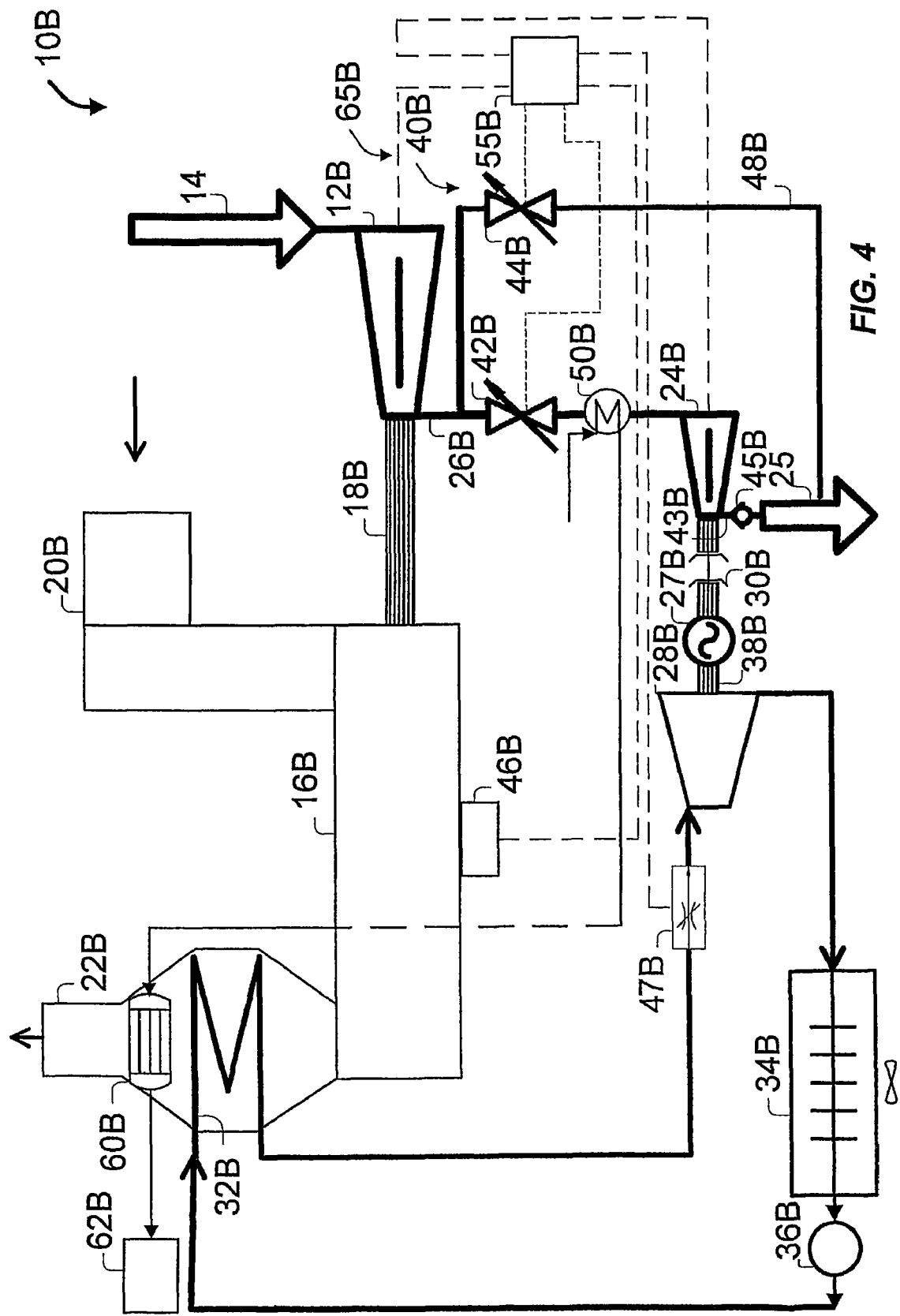
FIG. 4 illustrates the general layout of the main elements of the third embodiment of the present invention.

Turning now to FIG. 4, a third embodiment of the present invention is described with reference to this figure where reference numeral 10B designates the pressure augmenting apparatus designed and operated in accordance with a third embodiment of the present invention. In this embodiment, which is considered at present to be the best mode for carrying out the present invention, in addition to optionally and preferably including an intercooler for cooling compressed gas exiting the first compressor as well as an optional heat exchanger for extracting heat still present in the exhaust gases of the gas turbine, a bypass line 48B is provided in order to take advantage of the combination of the electric generator or alternator and the second compressor driven or operated by the vapor turbine. Actually, the rest of the equipment in this embodiment is substantially the same as that described with reference to FIG. 3. Thus, apparatus 10B in this embodiment also includes, as shown in FIG. 4, first compressor 12B for compressing the gas flowing in gas pipeline 14. First compressor 12B is driven or operated by gas turbine 16B via coupling 18B that uses air supplied through duct 20B and produces mechanical power for running compressor 12B. Gas turbine 16B includes an air compressor (not shown) for compressing the air supplied via inlet duct 20B, a combustor (not shown) for combusting fuel supplied thereto in the presence of air supplied by the air compressor and turbine (not shown) for expanding the hot combustion products or gases exiting the combustor. Exhaust gas produced by gas turbine 16B exits via stack 22B.

Apparatus 10B also includes, as shown in FIG. 4, second compressor 24B for compressing the compressed gas exiting first compressor 12B via line 26B. Intercooler 50B cools the compressed gas exiting first compressor 12B via line 26B with the heat extracted from the compressed gas being transferred to a heat transfer fluid, e.g. water, etc. and the cooled compressed air exiting intercooler 50B is supplied to second compressor 24B. Second compressor 24B is also driven or operated here by vapor turbine 28B via coupling 30B. Preferably, vapor turbine 28B receives vapor from heat recovery boiler 32B that is produced from liquid working fluid present therein which receives heat from the exhaust gas exiting gas turbine 16B. Condenser 34B, which can be air-cooled or water-cooled, preferably air-cooled, receives expanded vapor that exits vapor turbine 28B and produces condensate that is supplied by pump 36B from condenser 34B to heat recovery boiler 32B thus completing the power cycle. While the vapor turbine may be a steam turbine, preferably, the vapor turbine is an organic vapor turbine using an organic working fluid (directly or indirectly using an intermediate heat transfer fluid cycle using, for example, thermal oil). Examples of such organic working fluids can be either pentane, n-pentane or iso-pentane, or any other organic fluids, or any other suitable fluid, used as the working fluid in the organic vapor turbine used in the power cycle operating in accordance with an organic Rankine cycle. In addition, heat still present in exhaust gas of gas turbine 16B is transferred to heat transfer medium present in heat exchanger 60B supplied from intercooler 50B. The further heated heat transfer medium exiting heat exchanger 60B is supplied to a heat consumer or heat consumers for use.

Additionally, this embodiment of the present invention includes electric generator or alternator 27B that is also driven or operated by vapor turbine 28B (similar to electric generator or alternator 27A that is driven or operated by vapor turbine 28A shown in FIG. 3) and second compressor 24B. Electric generator or alternator 27B is coupled to vapor turbine 28B via mechanical coupling 38B while electric generator or alternator 27B is coupled to second compressor 24B via mechanical coupling 30B that can be selectively disengaged.

However, and in contrast to the first embodiment, the apparatus according to the third embodiment comprises a shut-off valve system 40B, comprising valves 42B and 44B, and bypass system 65B. Thus, the first compressor 12B may be in selective communication with the second compressor 24B via a conduit 26B and shut off valve 42B, and the downstream side of the second compressor connects to the downstream portion 25 of the pipeline 14 via conduit 43B and non-return valve 45B. Alternatively, the first compressor 12B may be in selective communication with the downstream portion 25 of the pipeline 14 via bypass conduit 48B and valve 44B. Thus, conduit 26B bifurcates towards the two valves 42B and 44B, and similarly, conduits 43B and 489B merge together downstream of non-return valve 45B. Moreover, the present embodiment includes controller 55B for controlling the operation of the bypass system as well optimizing operation of the augmentation apparatus 10B.

Optionally, valves 42B and 44B may be replaced with a suitable two-way valve.

In this embodiment, if for some reason, the flow rate of the gas in the gas pipeline 14 is decreased and consequently the required gas pressure is lower, the gas flow can be diverted via a bypass line 48B provided so that second compressor 24B is avoided and consequently the level of electricity production of the electric generator or alternator 27B operated by vapor turbine 28B will be increased. On the other hand, if the flow rate of the gas in gas pipeline 14 is increased, the electrical load being supplied the electric generator or alternator 27B operated by vapor turbine 28B can be decreased or even removed to enable increased mechanical power to be supplied to second compressor 24B.

Optionally, the valve system 40B may be operated such that both valves are fully closed, for example to stop the flow of gas, in which case the upstream compressors are typically shut off as well.

Also, in the present embodiment, first compressor 12B is of a rating that is larger than that of the second compressor 24B. As a non-limiting example, also here, first compressor 12B compresses the gas flowing in gas pipeline 14 to more that 50%, and preferably to about 80% of the required pressure head while second compressor 24B compresses the compressed gas exiting first compressor 12B by less than 50% of the required pressure head, preferably a further approximately 20% of the remaining pressure head. Thus, the first pressure head provided by the first compressor 12B is typically substantially greater than the second pressure head provided by the second compressor 24B. Preferably the first pressure head is about 4 times greater than the second pressure head.

In operation, first compressor 12B, driven or operated gas turbine 16B, compresses the gas flowing in gas pipeline 14 and produces compressed gas. Second compressor 24B further compresses the compressed gas exiting first compressor 12B and produces, in gas pipeline 25B, further compressed gas. Intercooler 50B, cools compressed gas exiting first compressor 12B, present in line 26B, by transferring heat extracted from the compressed gas to the heat transfer fluid present in intercooler 50B and produces cooled compressed gas. Vapor turbine 28B drives or operates second compressor 24B as well as electric generator or alternator 27B and receives vapor produced by heat recovery boiler 32B which utilizes heat contained in the exhaust gas exiting gas turbine 16B. These vapors expand in vapor turbine 28B and produce work so that the vapor turbine drives second compressor 24B causing it to rotate and consequently compress the cooled compressed gas exiting intercooler 50B, producing further compressed gas in the downstream part 25 of gas pipeline 14. In addition, electric generator or alternator is rotated by vapor turbine 28B via mechanical coupling 38B and produces electricity. Further, disengageable coupling 30B is coupled to said electricity generating means 27B and to said second compressor 24B, wherein said disengageable coupling selectively disengages said second compressor from said electricity generating means. Expanded vapor exiting vapor turbine 28B is supplied to condenser 34B, which is preferably air-cooled where it condenses and the condensate produced is supplied by cycle pump 36B to heat recovery boiler 32B thus completing the power cycle.

The shut-off valve system 40B and the disengageable mechanical coupling 30B for second compressor 24B enables the transfer of the gas in the pipeline while bypassing second compressor 24B, which will be disengaged via bypass line 48B and disengageable mechanical coupling 30B (see FIG. 4A), when gas flow is low for some reason in the gas pipeline. As a result, in such a case, second compressor 24B is avoided by the gas flow, and vapor turbine 28B and electric generator or alternator 27B will produce increased electric power, the alternator 27B being mechanically disconnected from the second compressor 24B for increased efficiency, as illustrated in FIG. 4. Preferably, the disengageable coupling 30B further including means for operating said disengageable coupling so that said second compressor is disengaged when gas flow in the pipeline is low and for permitting the gas to flow via said second conduit 48B of said bypass means using said shut off valve system 40B.

Figure 4A:
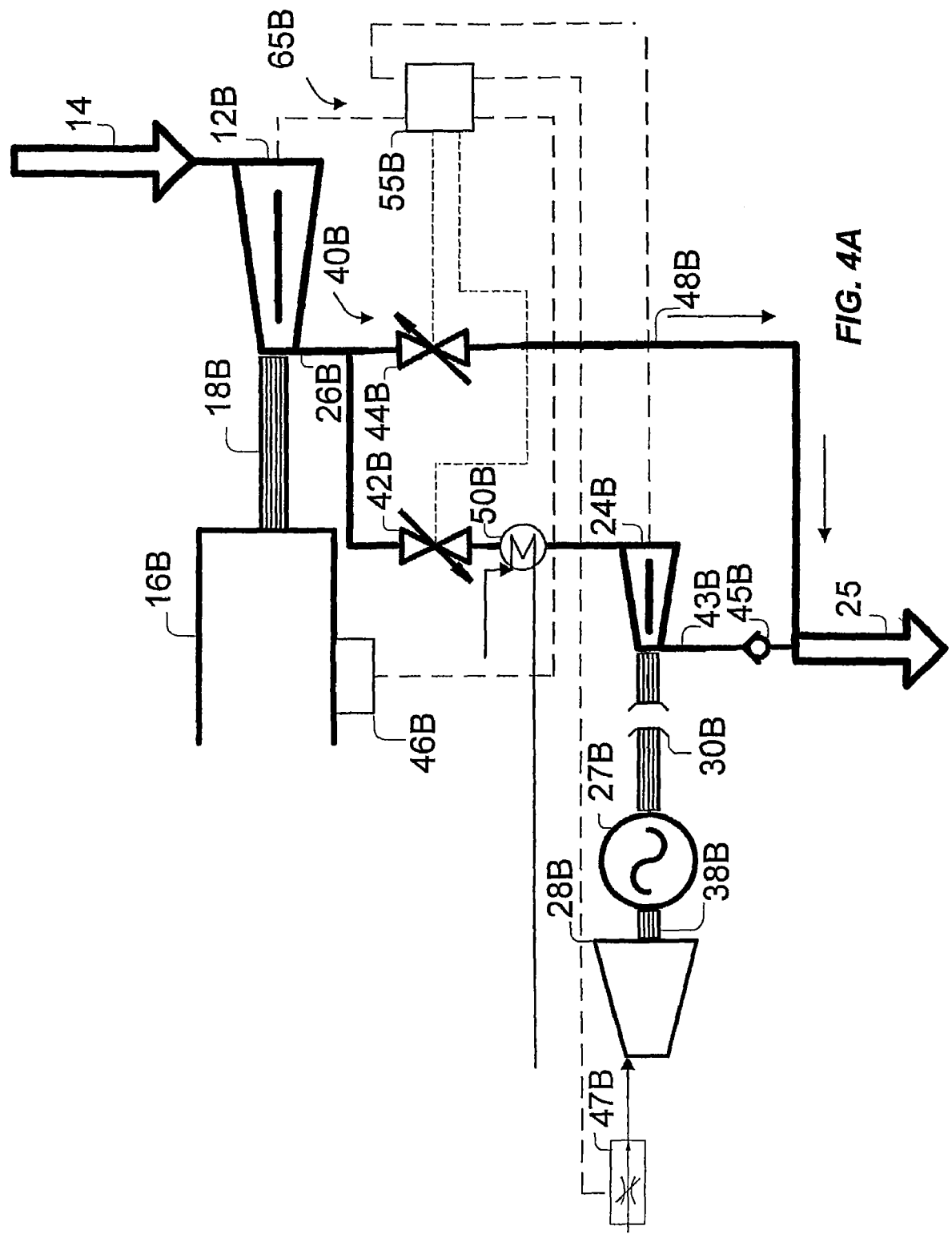
FIG. 4(a) and FIG. 4(b) illustrate, in fragmented view, alternative operative connection modes between the vapor turbine and the second compressor of FIG. 4.
Figure 4B:
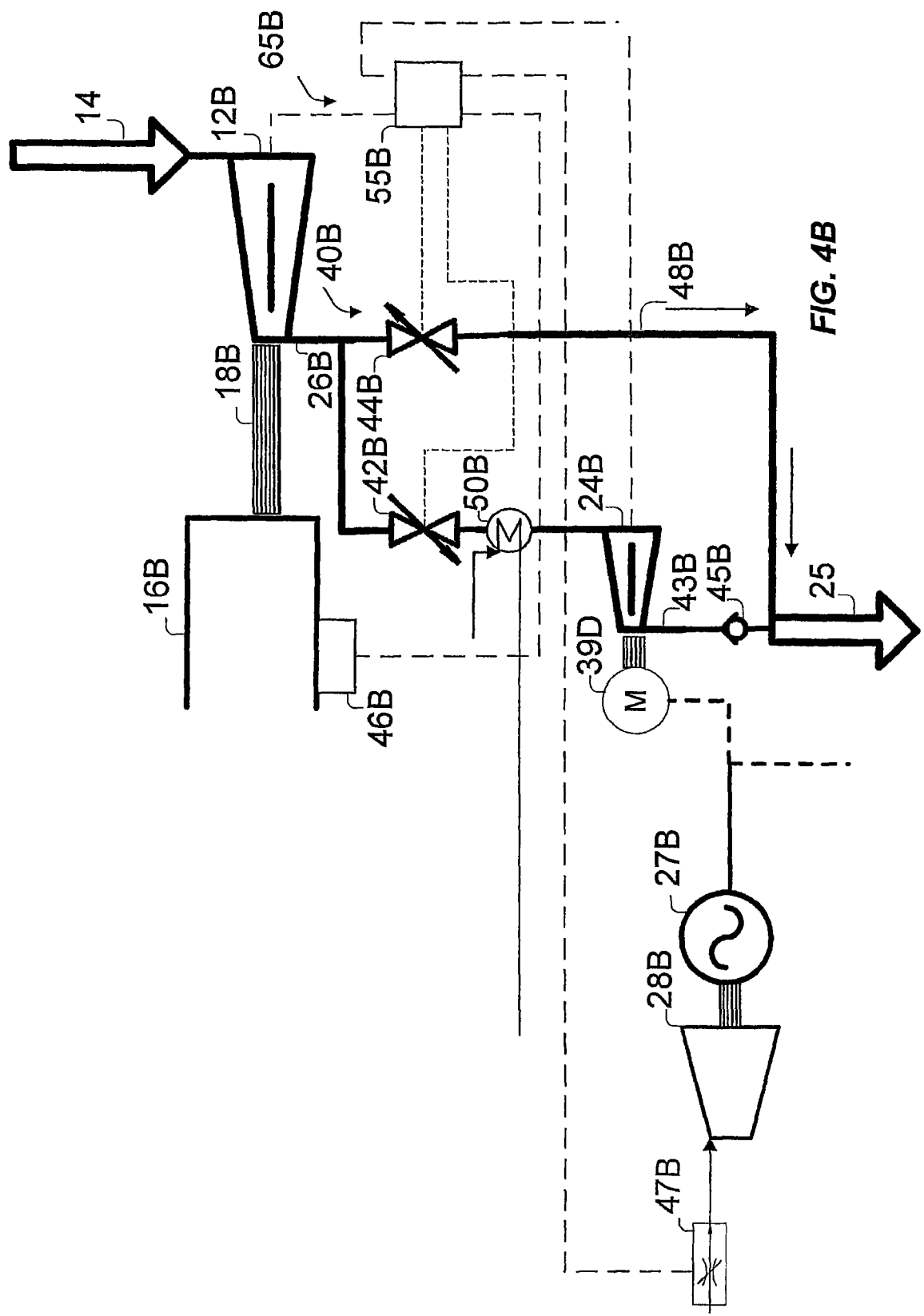

In a further option of the third embodiment, and referring to FIG. 4B, a further example of the coupling between the vapor turbine, electric generator or alternator and second compressor is illustrated. Here, electric generator or alternator 27B is rotated by coupling 38B and produces electricity and the electric power or electricity at least portion of which is used to run electric motor 39D for driving second compressor 24B. Thus, in such a manner the second compressor is avoided and the level of electrical power production of the alternator or generator run by the vapor turbine 28B is increased.

In addition, heat still present in exhaust gas of gas turbine 16B is transferred to heat transfer medium present in heat exchanger 60B supplied from intercooler 50B. The further heated heat transfer medium exiting heat exchanger OB is supplied to heat consumer or heat consumers 62B for use. For example, this can be used for process heat and/or domestic heating purposes. Alternatively, this heat can be accumulated and stored for later use.

Furthermore, controller or control system 55B controls the operation of the apparatus, in particular of said first compressor means and of said second compressor means, as well as of said gas turbine and of said vapor turbine. The control system 55B also comprises means for optimizing the operation of the apparatus, and particularly for optimizing the fuel consumption of the fuel combusted in said gas turbine. The control system may also comprise means including a throttle valve or variable nozzle for controlling the operation of said vapor turbine. This fuel consumption optimizing means may comprise fuel metering means.

In the present invention, two extreme conditions can exist. The first condition occurs when compressor 12B driven by gas turbine 16B rotates at maximum speed while compressor 24B driven by vapour turbine 28B rotates at a speed appropriate to obtain the required flow of gas in the pipeline. Under such a condition, the fuel consumption of the gas turbine combustor of gas turbine 12B will be a maximum. On the other hand, in the other extreme condition, compressor 24B rotates at a maximum speed while compressor 12B rotates at the appropriate speed to maintain the required flow of gas in the pipeline. Under such a condition, the fuel consumption of the gas turbine combustor of gas turbine 12B will be at a minimum. Controller or control system 55B of the present invention controls the speeds of compressor 12B, compressor 24B and vapor turbine 24B so that minimum fuel consumption of the gas turbine combustor of gas turbine 16B is achieved as fast as possible and maintained at the minimum in spite of fluctuations in flow of the gas in the pipeline.

In operation, controller 55B selects the optimal speeds for both compressors 12B and 24B, to achieve minimal fuel consumption of the fuel combusted in the combustor (not shown) of the gas turbine. The control system first of all ensures that the desired gas flow through the pipeline 14 is achieved and then it permits incremental steps in the running speed of each of the two compressors 12B and 24B to be taken while measuring the fuel flow rate, and a combination of compressor speeds is chosen such that maintains the fuel flow rate to a minimum, thus obtaining the best efficiency. Alternatively, a family of optimal performance curves will be mapped out experimentally (and re-verified periodically) and used in control system 55B in order that an optimal compressor speed for each compressor 12B and 24B be chosen as a function of gas flow, inlet and outlet pressures and temperatures of each compressor. The speed of compressor 12B is controlled by changing the speed demand of the gas turbine control which actuates the fuel metering valve 46B of the combustor of the gas turbine. Similarly, the speed of second compressor 24B is controlled by changing the speed demand of the vapor turbine control which actuates throttle valve or variable nozzle 47B of the vapor turbine.

Furthermore, it should be pointed out that the present invention can be used in an existing pipeline compressor installation wherein the second compressor is added to the existing pipeline compressor installation (without exceeding the existing upper pressure limit of the existing pipeline compressor installation). Alternatively, the present invention can be used in a new pipeline compressor installation and bring about an increased energy efficiency level.

Moreover, it is to be pointed out that the option described with reference to FIG. 2 which does not include an electric generator or alternator can be used in all of the embodiments of the present invention.

In the above description it is pointed out that preferably, the vapor turbine is an organic vapor turbine using an organic working fluid, e.g., pentane (directly or indirectly using an intermediate heat transfer fluid cycle using, e.g., thermal oil), pentane, either n-pentane or iso-pentane or other suitable organic fluids, in the power cycle operating in accordance with an organic Rankine cycle.

Referring to FIG. 4, another embodiment of the auxiliary apparatus of the invention comprises all the elements of the first embodiment of the auxiliary apparatus, and optionally further comprises bypass means for the pipeline, the bypass means comprising: — a first conduit and a second conduit each comprising suitable shut off valve means;

a common first connector adapted for connecting said first conduit and said second conduit to said first pressure augmenting means;

a common second connector adapted for connecting said first conduit and said second conduit to said pipeline;

wherein said first conduit is in communication with said second pressure augmenting means downstream of the said shut off valve means thereof; and wherein said first conduit further comprises a non-return valve intermediate said second connector and said second pressure augmenting means.

The shut-off valve system 40B, comprises valves 42B and 44B, and bypass system 65B, similar to the corresponding components described with respect to the third embodiment of the augmenting apparatus as described herein, mutatis mutandis.

Similarly, all embodiments of the auxiliary apparatus may also comprise an intercooler arrangement connected to either the said first connection means 31 or the said second connection means 23, and to the said second compressor.

Note that when an indirect cycle is used, the apparatus and method disclosed in U.S. Pat. No. 6,571,548, the disclosure of which is hereby incorporated by reference, can be used and incorporated into the apparatus and method of the present invention. Thus in such an option, an intermediate heat transfer fluid, such as pressurized water or thermal oil, for example, used according to the method and apparatus disclosed in U.S. patent application Ser. No. 09/860,516 (equivalent to EP 1158161A2), the disclosure of which is incorporated herein by reference, can be used for vaporizing the working fluid of the vapor turbine. In addition, in an indirect cycle, the apparatus and method disclosed in U.S. patent application Ser. No. 09/702,711 (equivalent to EP 1174590A2), the disclosure of which is hereby incorporated by reference, can also be used, wherein a synthetic alkylated aromatic heat transfer fluid, for example, can be used as the intermediate fluid. In the case of use of apparatus and methods in accordance with the disclosure of U.S. patent application Ser. No. 09/702,711, where the intermediate heat transfer fluid, as well as the organic working fluid, is vaporized and used to operate a vapor turbine in addition to the vapor turbine operated by the vaporized organic working fluid, the two vapor turbines can both be used to operate or drive the second compressor.

Thus, for example, the heating means for the auxiliary apparatus may comprise a heat recovery system comprising:

an intermediate fluid;

a heater that heats the intermediate fluid with heat from said heating means and produces a heated intermediate fluid;

a working fluid vaporizer that vaporizes said liquid working fluid with heat from the heated or vaporized intermediate fluid to form a vaporized working fluid and a cooled intermediate fluid;

a fluid condenser that condenses said expanded organic vaporized working fluid to produce a working fluid condensate so that the working fluid condensate is supplied to the working fluid vaporizer.

Optionally, the heat recovery system may be configured such that a secondary vapor turbine may be included, wherein:

said heater comprises a vaporizer that vaporizes the said intermediate fluid with heat from said heating means and produces a vaporized intermediate fluid;

said secondary vapor turbine expands the vaporized intermediate working fluid, and this vapor turbine generates power and produces expanded vaporized intermediate working fluid;

said working fluid vaporizer vaporizes said liquid working fluid with heat from the vaporized intermediate fluid to form a vaporized working fluid and an intermediate fluid condensate;

said fluid condenser condenses said expanded organic vaporized working fluid to produce a working fluid condensate so that the working fluid condensate is supplied to the working fluid vaporizer.

The secondary vapor turbine may also be operatively coupled to the second compressor for further augmenting the pressure head provided by said gas turbine. Alternatively, the secondary vapor turbine is operatively coupled to a third pressure augmenting means in communication with said second pressure augmentation means for further augmenting the pressure head provided by the gas turbine.

Typically, the intermediate fluid comprises a thermal heat transfer fluid, for example a thermal oil or a synthetic, alkylated, aromatic heat transfer fluid.

Thus, by using the present invention, particularly with reference to FIG. 4, FIG. 4a and FIG. 4b, advantage can be taken of the presence of the second compressor and vapor turbine to efficiently supplement the operation of the first compressor.

In addition, the present invention provides a method for transmitting natural gas in a large scale natural gas transmission system for transmitting the natural gas for one location to another. Such transmission systems can spread over tens to hundreds of kilometers. By using the present invention as an integral portion of such a natural gas transmission system, such natural gas transmission systems become efficient in operation as well now providing flexibility of operation such that such operate is efficient at different natural gas flow rates.

Optionally, and for all embodiments, the heat recover boiler may further comprise alternative emergency and/or stand-by and/or auxiliary sources of heat or heating means. For example, a separate auxiliary heat recovery boiler arrangement, heated e.g. by a heat source such as a suitable gas, liquid or solid fuel, may be provided for heating the working fluid. Such alternative sources of heat may be of particular utility when the gas turbine is inoperational due to a breakdown or maintenance, enabling the pressure augmenting apparatus to provide at least some of the pressure head required for the pipeline 14.

For all embodiments, optionally, the power generated by the generator or alternator that is coupled to the vapor turbine may be partially or fully diverted to an electric grid, for example, and similarly, a motor coupled to the second compressor may be powered from such a grid. Thus, any excess power over and above that required to run the second compressor may be utilized or sold.

Similar problems to the transport of gases are also sometimes encountered in the large-scale transport of liquids such as oil or water, for example. While the description herein is directed to a gas pipeline, and thus the use of compressors as the pressure augmenting means, the apparatus and method according to the present invention may also be adapted for the pressurization and transport of liquids, such as for example oil or water, through a pipeline, in a similar manner to that described herein for a gas pipeline, mutatis mutandis, wherein the pressure augmenting means now refer to pump arrangements rather than to compressor arrangements.

While the above embodiments have been described with reference to a gas turbine and a vapor turbine, the apparatus according to the invention may in fact comprise a plurality of gas turbines and/or a plurality of vapor turbines, which may be arranged in series in any permutation, at any given location or number of locations along the pipeline. The waste heat from each of the gas turbines may be extracted by a common or separate means to provide a common heat source or individual heat sources, and similarly, a common working fluid may be used for operating all or a group of vapor turbines, or each vapor turbine may be operated with a dedicated working fluid and working fluid vaporization circuit. An advantage of having more than one gas turbine or more than one vapor turbine in a booster station is that the turbines can be smaller than a larger one of equal combined rating, and further provides flexibility of operation and safety margins should one or another of the turbines malfunction.

While the embodiments have been described herein as comprising the at least one gas turbine upstream of the at least one vapor turbine, the arrangement may be reversed, with the gas turbine being located downstream of the vapor turbine.

The advantages and improved results furnished by the method and apparatus of the present invention are apparent from the foregoing description of the preferred embodiment of the invention. Various changes and modifications may be made without departing from the spirit and scope of the invention as described in the appended claims.

The invention claimed is:

1. Auxiliary apparatus for augmenting the pressure head of a gas flowing in a pipeline that may be provided by at least one gas turbine running a first pressure augmenting means, said auxiliary apparatus comprising:
   a) a vapor turbine operatively connected to a second pressure augmenting means;
   b) first connection means for providing fluid communication between said pipeline and said second pressure augmenting means;
   c) second connection means for providing fluid communication between said first pressure augmenting means and said second pressure augmenting means;
   d) heating means for vaporizing a working fluid of said vapor turbine;
   e) bypass means for said pipeline having a bypass conduit and shut-off valve system for connecting said first pressure augmenting means to a portion of said pipeline downstream of said first pressure augmenting means via a bypass conduit; and
   f) a disengageable coupling coupled to electricity generating means operated by said vapor turbine and to said second pressure augmenting means, wherein said disengageable coupling selectively disengages said second pressure augmenting means from said electricity generating means, and further including means for operating said disengageable coupling so that said second pressure augmenting means is disengaged when gas flow in the pipeline is low and for permitting the gas to flow via said bypass conduit of said bypass means using said shut off valve system.

2. The auxiliary apparatus as claimed in claim 1, further comprising bypass means for said pipeline, said bypass means comprising:
   a) the bypass conduit comprising a first conduit and a second conduit each comprising shut off valve means;
   b) a common first connector adapted for connecting said first conduit and said second conduit to said first pressure augmenting means;
   c) a common second connector adapted for connecting said first conduit and said second conduit to said pipeline;
   d) wherein said first conduit is in communication with said second pressure augmenting means downstream of the said shut off valve means thereof; and
   e) wherein said first conduit further comprises a non-return valve intermediate said second connector and said second pressure augmenting means.

3. The auxiliary apparatus as claimed in claim 1 wherein said working fluid flows in a closed circuit which comprises a heat exchanger operatively connected to said heating means, and further comprises a condenser for producing condensate of said working fluid and a pump arrangement for providing said working fluid to said heating means.

4. The auxiliary apparatus as claimed in claim 1 wherein said heating means comprises a heat recovery boiler arrangement for recovering waste heat produced by said at least one gas turbine.

5. The auxiliary apparatus as claimed in claim 1 wherein said heating means comprises a heat recovery system comprising:
   a) an intermediate fluid;
   b) a heater that heats the intermediate fluid with heat from said heating means and produces a heated intermediate fluid;
   c) a working fluid vaporizer that vaporizes said liquid working fluid with heat from the heated intermediate fluid to form a vaporized working fluid that is expanded in said vapor turbine and a cooled intermediate fluid; and
   d) a fluid condenser that condenses organic vaporized working fluid exiting said vapor turbine to produce a working fluid condensate so that the working fluid condensate is supplied to the working fluid vaporizer.

6. The auxiliary apparatus as claimed in claim 5, further comprising a secondary vapor turbine, and wherein:
   said heater comprises a vaporizer that vaporizes the said intermediate fluid with heat from said heating means and produces a vaporized intermediate fluid;
   said secondary vapor turbine expands said vaporized intermediate working fluid and generates power and produces expanded vaporized intermediate working fluid;
   said working fluid vaporizer vaporizes said liquid working fluid with heat from the vaporized intermediate fluid to form a vaporized working fluid and an intermediate fluid condensate; and
   said fluid condenser condenses said expanded organic vaporized working fluid to produce a working fluid condensate so that the working fluid condensate is supplied to the working fluid vaporizer.

7. The auxiliary apparatus as claimed in claim 6, wherein said secondary vapor turbine is operatively coupled to said second pressure augmenting means for further augmenting the pressure head provided by said gas turbine.

8. The auxiliary apparatus as claimed in claim 1 further comprising intercooler means in communication with said second connection means for cooling gas flowing between said first pressure augmenting means and said second pressure augmenting means.

9. The auxiliary apparatus as claimed in claim 8 wherein said intercooler means further includes a heat transfer fluid flowing in a circuit which comprises a heat exchanger operatively connected to said heat recovery boiler arrangement, for producing further heated heat transfer fluid, and a pump arrangement for providing said transfer fluid to said heat recovery boiler arrangement.

10. The auxiliary apparatus as claimed in claim 1 wherein said electricity generating means is driven by said vapor turbine.

11. The auxiliary apparatus as claimed in claim 1 further comprising an electric motor means suitably coupled to said second pressure augmenting means.

12. The auxiliary apparatus as claimed in claim 11, wherein said motor means receives electrical power from said electricity generating means.

13. The auxiliary apparatus as claimed in claim 1 wherein said heating means comprises auxiliary heating means.

14. The auxiliary apparatus as claimed in claim 13, wherein said auxiliary heating means comprises an auxiliary heat recovery boiler arrangement.

15. The auxiliary apparatus as claimed in claim 1 wherein said working fluid comprises an organic fluid.

16. The auxiliary apparatus as claimed in claim 15 wherein said working fluid comprises pentane.

17. The auxiliary apparatus as claimed in claim 5 wherein said intermediate fluid comprises a thermal heat transfer fluid.

18. The auxiliary apparatus as claimed in claim 17 wherein said intermediate fluid comprises a thermal oil.

19. The auxiliary apparatus as claimed in claim 6 wherein said intermediate fluid comprises a synthetic, alkylated, aromatic heat transfer fluid.

20. Augmenting apparatus for providing pressure to a gas flowing in a pipeline, comprising:
  at least one gas turbine adapted for running a first pressure augmenting means in fluid communication with a said pipeline for providing a first pressure head in said pipeline; and
  at least one said auxiliary apparatus according to claim 1 for running said second pressure augmenting means in fluid communication with said pipeline and said gas turbine, for providing a second pressure head in said pipeline.

21. Augmentation apparatus as claimed in claim 20 wherein said first pressure head is substantially greater than said second pressure head.

22. Augmentation apparatus as claimed in claim 20 further comprising a control system for controlling the operation of said first pressure augmenting means and said second pressure augmenting means as well as said gas turbine and said vapor turbine.

23. Augmentation apparatus as claimed in claim 22, wherein said control system further comprises means for optimizing the fuel consumption of the fuel combusted in said gas turbine.

24. Augmentation apparatus as claimed in claim 23, wherein said means for optimizing the fuel consumption of the fuel combusted in said gas turbine further comprises a fuel metering means, and wherein said control means further includes at least one of a throttle valve and variable nozzle for controlling the operation of said vapor turbine.

25. Augmentation apparatus as claimed in claim 1 wherein said first pressure augmenting means and said second pressure augmenting means comprise compressors.

26. A pipeline for transporting a gas from at least one source to at least one destination, comprising the augmentation apparatus of claim 20 for providing fluid pressure to the gas flowing in said pipeline.

27. The auxiliary apparatus according to claim 1 further comprising a valve for controlling the operation of said vapor turbine.

28. The auxiliary apparatus according to claim 27 wherein said valve is a vapor throttle for controlling the operation of said vapor turbine.

29. The auxiliary apparatus according to claim 27 further comprising a control system for controlling said valve.

30. The auxiliary apparatus according to claim 1 wherein said auxiliary apparatus includes a plurality of gas turbines.

* * * * *

UNITED STATES PATENT AND TRADEMARK OFFICE
CERTIFICATE OF CORRECTION

| | | |
|---|---|---|
| PATENT NO. | : 7,950,214 B2 | Page 1 of 1 |
| APPLICATION NO. | : 10/571539 | |
| DATED | : May 31, 2011 | |
| INVENTOR(S) | : Lucien Y. Bronicki et al. | |

It is certified that error appears in the above-identified patent and that said Letters Patent is hereby corrected as shown below:

Col. 15, claim 1, line 18, delete "via a bypass conduit";

Col. 15-16, claim 2, line 1, delete "further comprising bypass means for said pipeline";

Claim 2, line 3, after "means," insert --further--;

Claim 2, line 4, delete "the bypass conduit comprising".

Signed and Sealed this
Nineteenth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,950,214 B2 | Page 1 of 1 |
| APPLICATION NO. | : 10/571539 | |
| DATED | : May 31, 2011 | |
| INVENTOR(S) | : Lucien Y. Bronicki et al. | |

It is certified that error appears in the above-identified patent and that said Letters Patent is hereby corrected as shown below:

Column 15, lines 50-51 (Claim 1, lines 18-19) delete "via a bypass conduit";

Column 15, lines 63-64 (Claim 2, lines 1-2) delete "further comprising bypass means for said pipeline";

Column 15, line 65 (Claim 2, line 3) after "means," insert --further--;

Column 15, line 66 (Claim 2, line 4) delete "the bypass conduit comprising".

This certificate supersedes the Certificate of Correction issued July 19, 2011.

Signed and Sealed this
Sixteenth Day of August, 2011

David J. Kappos
*Director of the United States Patent and Trademark Office*